United States Patent [19]

Shim

[11] Patent Number: 5,698,953
[45] Date of Patent: Dec. 16, 1997

[54] CIRCUIT FOR CORRECTING TILT OF A MONITOR

[75] Inventor: Yong Deog Shim, Seoul, Rep. of Korea

[73] Assignee: Daewoo Electonics Co., Ltd., Seoul, Rep. of Korea

[21] Appl. No.: 638,621

[22] Filed: Apr. 26, 1996

[30] Foreign Application Priority Data

Apr. 28, 1995 [KR] Rep. of Korea ............... 95-10301

[51] Int. Cl.[6] .................................... H01J 29/56
[52] U.S. Cl. ............................................ 315/371
[58] Field of Search ............................ 315/371, 370; 348/806

[56] References Cited

U.S. PATENT DOCUMENTS

| | | | |
|---|---|---|---|
| 4,482,846 | 11/1984 | Worster | 315/371 |
| 4,547,708 | 10/1985 | Haferl | 315/371 |
| 4,623,825 | 11/1986 | Wahlquist et al. | 315/370 |
| 4,757,239 | 7/1988 | Starkey, IV | 315/371 |
| 5,216,504 | 6/1993 | Webb et al. | |

*Primary Examiner*—Theodore M. Blum
*Attorney, Agent, or Firm*—Lowe, Price, LeBlanc & Becker

[57] ABSTRACT

A circuit for correcting tilt of a monitor enhances picture quality by eliminating a tilt phenomena includes a signal generating section for generating a first signal varied in accordance with a control signal determined by frequency bands of a horizontal sync signal and a vertical sync signal supplied to a microprocessor and a constant second signal in accordance with an externally-supplied input signal, and a tilt correcting coil for adjusting a scanning angle of electron beam in accordance with the direction and magnitude of current varied by a magnitude difference between the first signal and second signal. Consequently, the first and second signals are generated from the control signal supplied from the microprocessor and the input signal, and the direction and magnitude of the current flowing through the tilt correcting coil is determined from the difference between the first signal and second signal, thereby correcting the tilt phenomena.

11 Claims, 4 Drawing Sheets

CIRCUIT FOR CORRECTING TILT OF A MONITOR

BACKGROUND OF THE INVENTION

1. Field of the Invention

The present invention relates to a monitor, and more particularly to a circuit for correcting tilt of a monitor for correcting a tilt phenomenon which is one kind of distortion.

2. Description of the Prior Art

Generally, the horizontal size and vertical size presented on the picture of a monitor is adjusted in accordance with frequency bands of an externally-supplied horizontal sync signal and vertical sync signal. The vertically and horizontally displayed area in the picture involves a variety of distortion as shown in FIGS. 1A through 1E.

More specifically, the distortions are such as a side pincushion phenomenon having the horizontal size of the picture deeply-set and stretched out to be shaped as a saddle as shown in FIG. 1A; a trapezoid phenomenon having different horizontal sizes at top and bottom as shown in FIG. 1B; and a parallelogram phenomenon having difference horizontal deflection positions of the upper or lower portions as shown in FIG. 1C. Also, FIG. 1D illustrates a corner pincushion phenomenon that the vertical size or horizontal size at the corners of the picture goes upward or downward.

A conventional distortion correcting circuit for eliminating the above-described distortion determines a distortion correcting value in accordance with the frequency bands of the externally-supplied horizontal sync signal and vertical sync signal, and varies the magnitude and shape of horizontal deflection signal and a vertical deflection signal in accordance with the distortion correcting value, thereby correcting the distortion.

However, the conventional distortion correcting circuit cannot eliminate the tilt phenomena of distorting the vertical size and horizontal size of the picture top and bottom. For this reason, such tilt phenomena have been heretofore displayed on the picture untouched.

SUMMARY OF THE INVENTION

Therefore, it is an object of the present invention to provide a circuit for correcting tilt of a monitor for eliminating a tilt phenomenon of distorting a picture of the monitor.

To achieve the above object of the present invention, a circuit for correcting tilt of a monitor includes a first control section for generating a first signal varied in accordance with an externally-supplied; control signal, and a second control section for generating a constant second signal in accordance with an externally-supplied input signal. Also, a tilt correcting coil adjusts a scanning angle of electron beam in accordance with the direction and magnitude of the current varied by a magnitude difference of the first signal and second signal.

According to a preferred embodiment of the present invention, the control signal is varied, and the control signal is supplied to the first controlling section which, in turn, generates the first signal in accordance with the magnitude of the control signal. Meanwhile, the input signal is supplied to the second controlling section which then generates the second signal in accordance with the input signal. As the result, the direction and magnitude of the current flowing through the tilt correcting coil are determined in accordance with the magnitude value of the first signal and second signal, thereby correcting the tilt phenomena appearing on the picture with the consequence of enhancing the picture quality of the monitor.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A circuit for correcting tilt of a monitor according to the present invention will be described in detail with reference to the accompanying drawings.

Figure 1A:
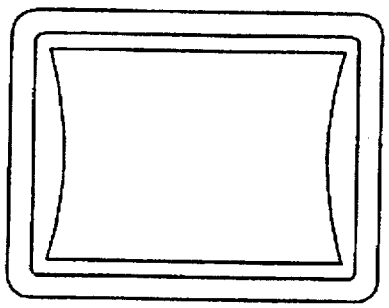
FIGS. 1A to 1E are views showing examples of distortion produced on a general monitor.
Figure 1B:
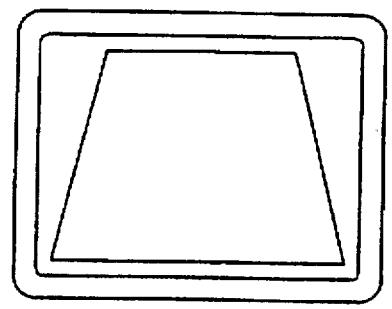
Figure 1C:
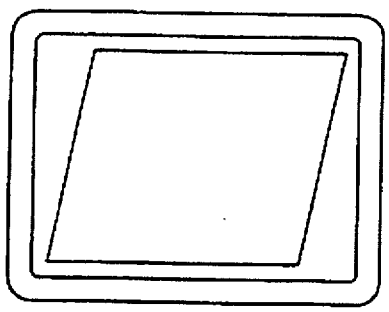
Figure 1D:
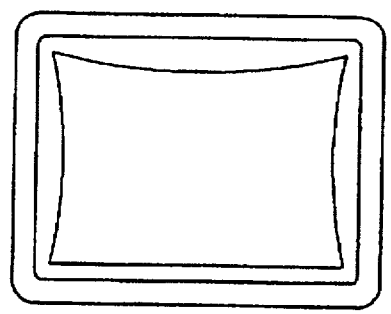
Figure 1E:
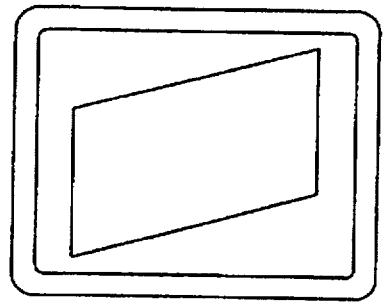
Figure 2:
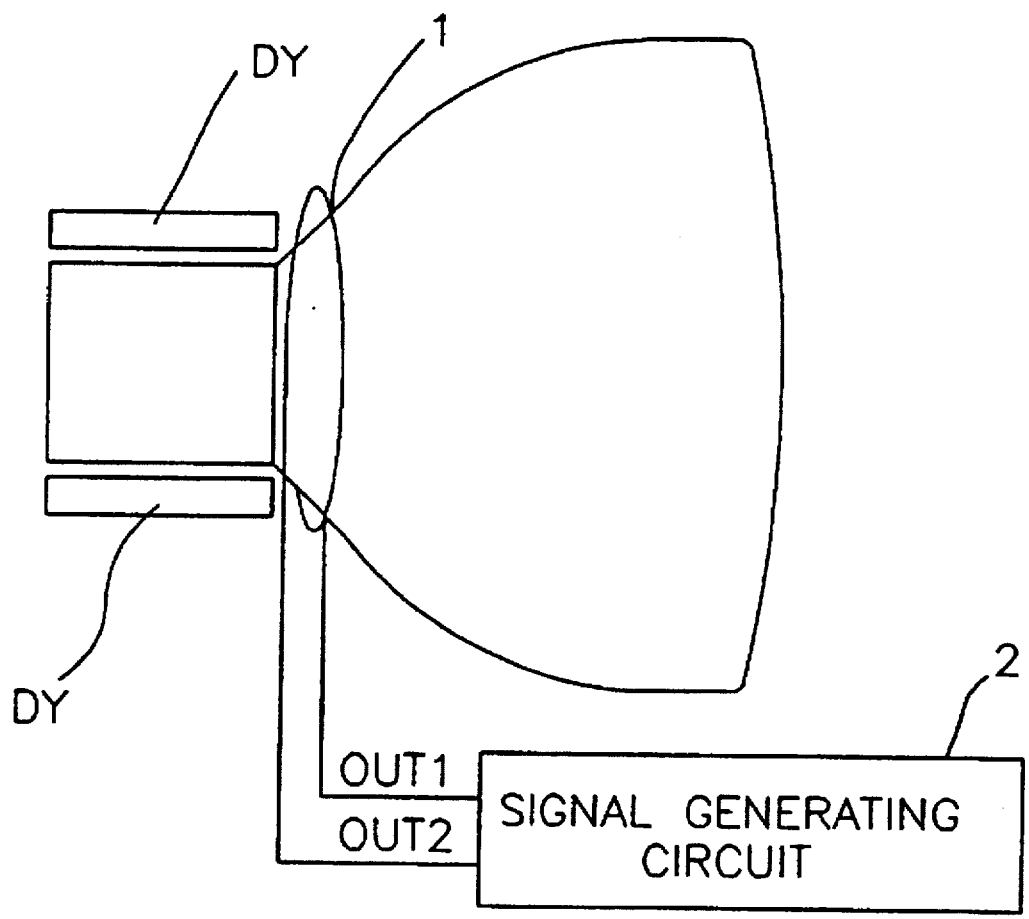
FIG. 2 is a schematic view showing a state of mounting a circuit for correcting tilt according to the present invention to a monitor.

FIG. 2 is a view schematically showing a state that the circuit for correcting tilt according to the present invention is mounted to the monitor. In FIG. 2, a reference numeral 1 denotes a tilt correcting coil installed to the front part of a deflection coil DY for adjusting an angle of beam emitted from an electron gun to correct the tilt phenomena, and 2 is a signal generating circuit connected between the input side and the output side of tilt correcting coil 1 to generate a signal for controlling direction and magnitude of current flowing through tilt correcting coil 1.

Figure 3:
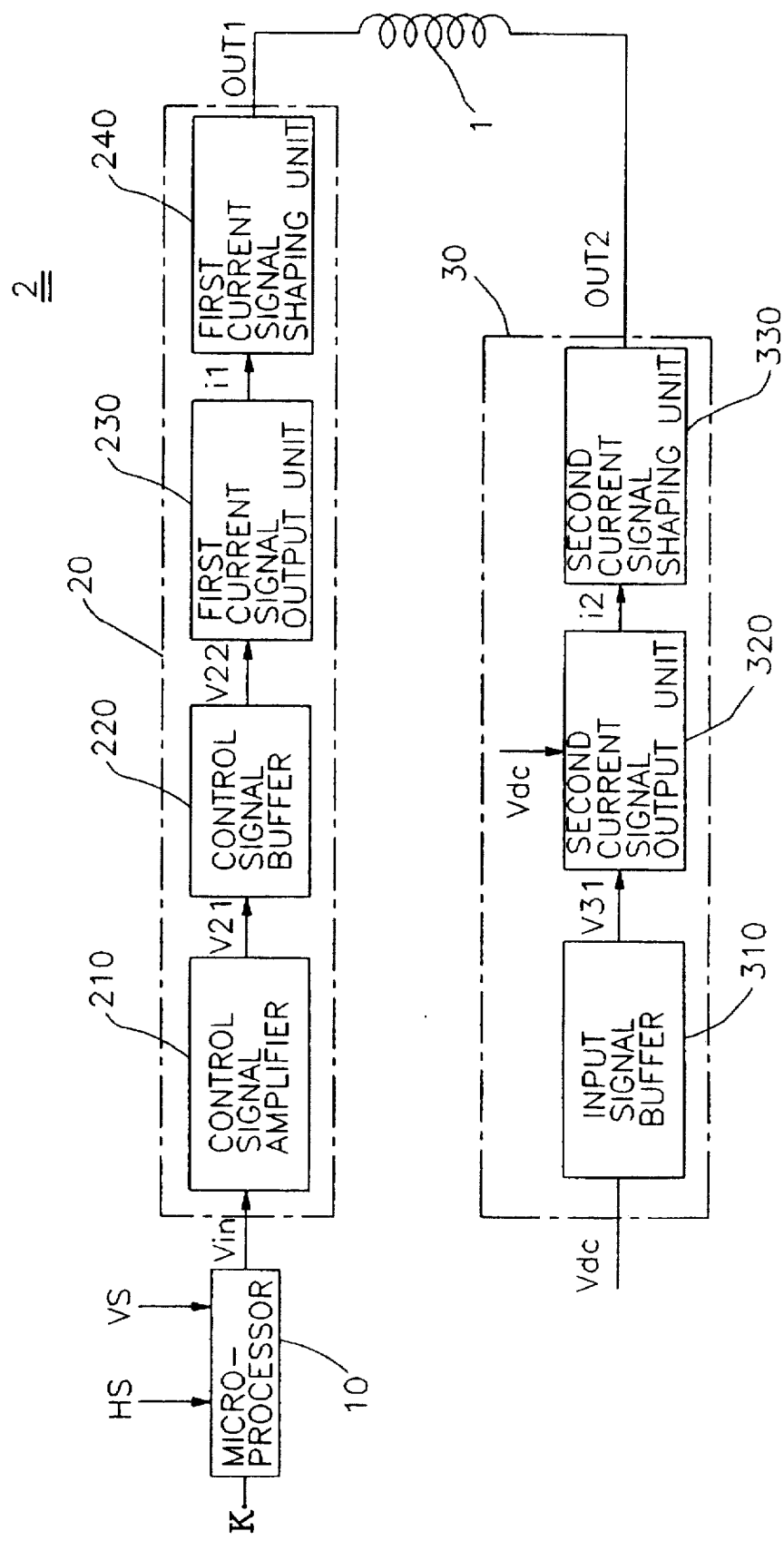
FIG. 3 is a schematic block diagram of the signal generating circuit shown in FIG. 2.
Figure 4:
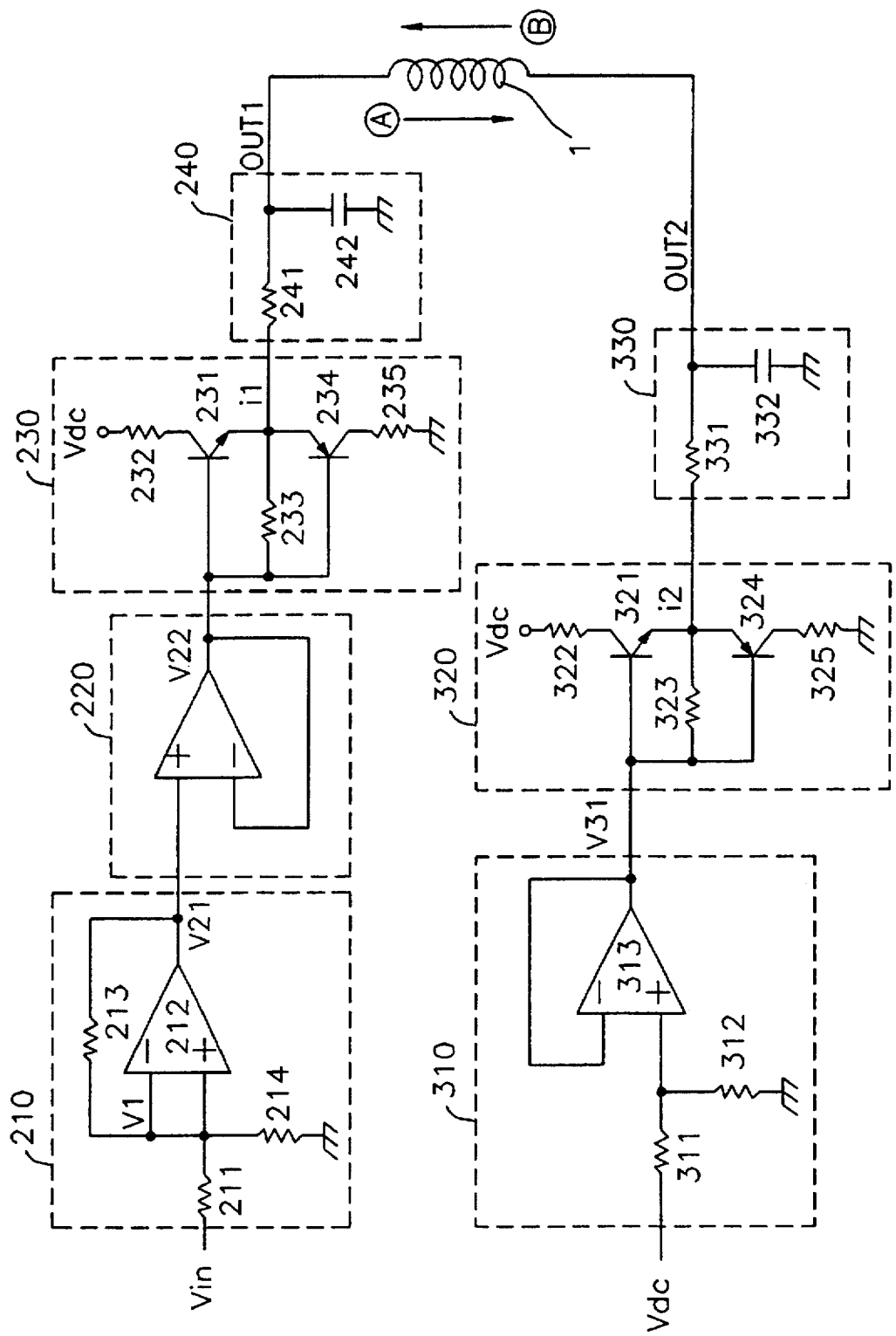
FIG. 4 is a detailed circuit diagram of the signal generating circuit shown in FIG. 3.

FIG. 3 is a block diagram schematically showing a construction of signal generating circuit 2 shown in FIG. 2, and FIG. 4 is a detailed circuit diagram of signal generating circuit shown in FIG. 3.

In FIG. 3, a reference numeral 10 denotes a microprocessor for receiving an externally-supplied key input signal K to provide a control signal Vin for correcting the tilt phenomena. Additionally, 20 is a first controlling section for generating a first signal OUT1 which controls the amount and direction of the current flowing through tilt correcting coil 1, and 30 is a second controlling section for generating a second signal OUT2 which controls the amount and direction of the current flowing through tilt correcting coil 1 in accordance with an externally-supplied input signal Vdc.

Here, first controlling section 20 includes a control signal amplifier 210 for amplifying control signal Vin from microprocessor 10, a first current signal output unit 230 for switching in accordance with an amplification signal V21 to generate a first current signal i1, and a first current signal shaping unit 240 for smoothing first current signal i1 to generate first signal OUT1 and supplying first signal OUT1 to one side of tilt correcting coil 1. In this construction, a control signal buffer 220 for buffering amplification signal V21 to produce a first buffer signal V22 may be connected to the output side of control signal amplifier 210 to contrive stabilization of amplification signal V21. A case of employing control signal buffer 220 will be taken to be described in this embodiment.

Second controlling section 30 has a second current signal output unit 320 for switching in accordance with input signal Vdc to generate a second current signal i2, and a second current signal shaping unit 330 for smoothing second current signal i2 to produce second signal OUT2, and supplying second signal OUT2 to the other side of tilt correcting coil 1. Here, an input signal buffer 310 for buffering input signal Vdc to produce a second buffer signal V31 may be connected to the input side of second current signal output unit 320 for stabilizing input signal Vdc. In this embodiment, a case of employing control signal buffer 310 will be taken to be described hereinbelow.

The foregoing construction will be described in more detail with reference to FIG. 4.

The output side of a resistor 211 for biasing control signal Vin of microprocessor 10 is connected with a positive terminal (+) of amplifier 212 for amplifying an output voltage of resistor 211. resistors 213 and 214 are connected to the output side of amplifier 212 and a ground for distributing amplification signal V21 which is the output signal of amplifier 212. At this time, resistors 213 and 214 are serially connected, and the output side of resistor 213 is connected with a negative terminal (−) of amplifier 212.

A positive terminal (+) of control signal buffer 220 for buffering amplification signal V21 is connected to the output side of amplifier 212, and control signal buffer 220 consists of a typical buffer.

The output side of amplifier 212 is switched in accordance with first buffer signal V22 of control signal buffer 220 to be connected to the base sides of transistors 231 and 234 of first current signal output unit 230 for generating first current signal i1, and the collector side of transistor 231 is connected with one side of a resistor 232 for determining the current amount of first current signal i1 which is the output current of transistor 231. The other side of resistor 232 is connected with externally-supplied input signal Vdc.

If first buffer signal V22 is abruptly varied, a potential difference between the base sides and emitter sides of transistors 231 and 234 becomes unstable to cause malfunction of transistors 231 and 234. One side of a resistor 233 for preventing the malfunction of transistors 231 and 234 are connected to the output side of control signal buffer 220.

The other side of resistor 233 is connected to the emitter side of transistor 231 and, simultaneously with the emitter side of transistor 234 which is switched in accordance with first buffer signal V22. The collector side of transistor 234 is connected with one side of a resistor 235 for controlling the output current of transistor 234, and the other side of resistor 235 is grounded.

The emitter side of transistor 231 is connected with one side of a resistor 241 of first current signal shaping unit 240 for biasing first current signal i1 of first current signal output unit 230. The other side of resistor 241 is connected with one side of a capacitor 242 for smoothing a bias signal of resistor 241. The other side of capacitor 242 is grounded.

One side of capacitor 242 is connected with one side of tilt correcting coil 1 for correcting the tilt phenomena.

Meanwhile, resistors 311 and 312 for distributing input signal Vdc is serially connected between the input side of input signal Vdc and the ground, and the output side of resistor 311 is connected with positive terminal (+) of buffer 313. The output side of buffer 313 is connected with a negative terminal (−) of buffer 313.

The output side of buffer 313 is connected with the base sides of transistors 321 and 324 of second current signal output unit 320 which is switched in accordance with second buffer signal V31 being the output signal of buffer 313 to generate second current signal i2.

The collector side of transistor 321 is connected with one side of resistor 322 for determining the current amount of second current signal i2 which is the output current of transistor 321. The other side of resistor 322 is connected with externally-supplied input signal Vdc.

Meantime, the output side of input signal buffer 310 is connected with one side of resistor 323 for preventing the malfunction of transistors 321 and 324. The other side of resistor 323 is connected with the emitter side of transistor 321 and, simultaneously with the emitter side of transistor 324 which is switched in accordance with second buffer signal V31.

The collector side of transistor 324 is connected with one side of resistor 325 for controlling the output current of transistor 324, and the other side of resistor 325 is grounded.

Also, the emitter side of transistor 321 is connected with one side of resistor 331 of second current signal shaping unit 330 for biasing second current signal i2 of second current signal output unit 320, and the other side of resistor 331 is connected with one side of capacitor 332 for smoothing the bias signal of resistor 331. The other side of capacitor 332 is connected with the ground.

One side of capacitor 332 is connected with the other side of tilt correcting coil 1 which supplies second signal OUT2 being the output signal of capacitor 332 to correct the tilt.

The correction of the tilt phenomena in the circuit for correcting the tilt of the monitor constructed as above is carried out as follows.

Once microprocessor 10 is externally supplied with horizontal sync signal Hs and vertical sync signal Vs, microprocessor 10 scan the key input signal K supplied by user's selection of a conventional key matrix and produces control signal Vin for correcting the tilt phenomena. That is, a user selects a key in order for the key matrix to output a key input signal K for correcting the tilt phenomena, and the key input signal K is supplied to the microprocessor 10. The microprocessor 10 outputs the control signal Vin which is previously stored and corresponding to the key input signal K.

Control signal Vin is supplied to first controlling section 10. Then, in first controlling section 20, transistors 231 and 234 are switched in accordance with control signal Vin and externally-supplied input signal Vdc to generate first current signal i1 which is smoothed to provide first signal OUT1. At this time, first signal OUT1 is varied in accordance with the potential of control signal Vin of microprocessor 10.

On the other hand, input signal Vdc is supplied to second controlling section 30. Then, in second controlling section 30, transistors 321 and 324 are switched in accordance with input signal Vdc to generate second current signal i2, and second current signal i2 is smoothed to provide second signal OUT2. At this time, second signal OUT2 has a potential constantly fixed in accordance with input signal Vdc.

When varied first signal OUT1 is greater than input signal Vdc, as shown in FIG. 4, it flows in the direction A. If varied first signal OUT1 is smaller than input signal Vdc, as shown in FIG. 4, flows in the direction B. In accordance with the direction and magnitude of the current flowing through tilt correcting coil 1, the scanning angle of electron beam is varied to correct the tilt phenomena.

In describing the above process more detail, control signal Vin of microprocessor 10 is supplied to amplifier 212 via resistor 211 of control signal amplifier 210, and amplifier 212 amplifies control signal Vin to provide amplification signal V21 amplified by a predetermined magnitude. Here, an amplifying range of amplifier 212 is determined by a distribution signal of resistors 213 and 214. Amplification signal V21 of amplifier 212 satisfies the following equation:

$$V21 = \left( \frac{213}{214} + 1 \right) * Vin$$

Amplification signal V21 of amplifier 212 is supplied to control signal buffer section 220 which buffers amplification signal V21 to provide first buffer signal V22. At this time, first buffer signal V22 of control signal buffer section 220 has the voltage value identical to amplification signal V21.

First buffer signal V22 and input signal Vdc are supplied to transistors 231 and 234 of first current signal output unit 230, and transistors 231 and 234 are switched in accordance with first buffer signal V22 and input signal Vdc.

On the other hand, input signal Vdc is supplied to resistors 311 and 312 of input signal buffer section 310, and resistors 311 and 312 distribute input signal Vdc. The distribution signal of resistors 311 and 312 is provided to buffer 313.

Then, buffer 313 buffers the distribution signal of resistors 311 and 312 to provide second buffer signal V31. Here, second buffer signal V31 has the potential identical to distribution signal V1 of resistors 311 and 312.

Second buffer signal V31 and input signal Vdc are supplied to transistors 321 and 324 of second current signal output unit 320, and transistors 321 and 324 are switched in accordance with input signal Vdc of second buffer signal V31. At this time, if first buffer signal V21 and second buffer signal V31 are identical to each other, all transistors 231, 234, 321 and 324 are switched in the turn-off state. Under this state, the current does not flow through tilt correcting coil 1.

Now, a case that control signal Vin is increased to make the potential of first buffer signal V22 be greater than that of second buffer signal V31 will be given below.

Control signal Vin of microprocessor 10 is supplied to amplifier 212 which amplifies control signal Vin to provide amplification signal V21.

Amplification signal V21 is supplied to control signal buffer section 220 which buffers amplification signal V21 to provide first buffer signal V22. Then, first buffer signal V22 and input signal Vdc are supplied to the base sides of transistors 231 and 234 of first current signal output unit 230. Therefore, transistor 231 is switched under the turn-on state, and transistor 234 is switched under the turn-off state.

Consequently, first current signal i1 being the output current of transistor 231 is supplied to capacitor 242 via resistor 241 of first current signal shaping unit 240, and capacitor 242 smooths first current signal i1 to produce first signal OUT1, so that first signal OUT1 is supplied to one side of tilt correcting coil 1.

Meantime, externally-supplied input signal Vdc is supplied to input signal buffer section 310 which, then, buffers input signal Vdc to generate second buffer signal V31.

At this time, since first signal OUT1 is larger than second buffer signal V31, the current through tilt correcting coil 1 flows toward the direction A shown in FIG. 4, and the output signal of tilt correcting coil 1 is supplied to capacitor 332 of second current signal shaping unit 330. Also, capacitor 332 charges up the output signal of tilt correcting coil 1.

The output signal of capacitor 332 is supplied to the emitter side of transistor 321 and the emitter side of transistor 324 of second current signal output unit 320 via resistor 331.

Here, since first signal OUT1 supplied to the emitter side of transistor 321 is greater than second buffer signal V31 supplied to the base side of transistor 321, transistor 321 is switched under the turn-off state. Also, since the potential at the emitter side of transistor 324 is higher than that at the base side of transistor 324, transistor 324 is switched under the turn-on state.

In other words, first signal OUT1 is greater than second buffer signal V31, so that the current through tilt correcting coil 1 flows toward the direction A, and the magnitude of the current flowing through tilt correcting coil 1 is determined in accordance with the potential difference between first signal OUT1 and second buffer signal V31.

In addition, the correcting direction and correcting value of the tilt appearing on the picture are determined in accordance with the direction and magnitude of the current flowing through tilt correcting coil 1. In more detail, tilt correcting coil 1 is magnetized in accordance with the direction and magnitude of the current flowing through tilt correcting coil 1 to incite a magnetic force in tilt correcting coil 1. By the magnetic force, the scanning angle of the electron beam emitted from the electron gun is varied. Thus, the tilt phenomena appearing on the picture is eliminated.

On the other hand, a case that control signal Vin is decreased to make the potential of first buffer signal V22 be lower than second buffer signal V31 will be described.

When first buffer signal V22 is smaller than second buffer signal V31, transistor 321 is switched under the turn-on state, and transistor 324 is switched under the turn-off state. Also, second current signal i2 being the output current of transistor 321 is supplied to capacitor 332 via resistor 331 of second current signal shaping unit 330, and capacitor 332 smooths second current signal i2 to generate second signal OUT2.

Second signal OUT2 is to be greater than first buffer signal V22, so that second signal OUT2 is supplied to capacitor 242 of first current signal shaping unit 240 via tilt correcting coil 1, and capacitor 242 charges up second signal OUT2. The charge signal of capacitor 242 is supplied to the emitter side of transistor 231 via resistor 241.

Here, second signal OUT2 supplied to the emitter side of transistor 231 is higher than first buffer signal V22 supplied to the base side of transistor 231. Accordingly, transistor 231 is switched under the turn-off state and, simultaneously the potential at the emitter side of transistor 234 is higher than that of the base side of transistor 234. Thus, transistor 234 is switched under the turn-on state.

Therefore, the current through tilt correcting coil 1 flows toward the direction B as shown in FIG. 4. This direction is opposite to the case that first signal OUT1 is greater than second signal OUT2.

When using the tilt correcting circuit of the monitor according to the present invention, the direction and magnitude of the current flowing through the tilt correcting coil are determined from the difference between the control signal and input signal. Also, the magnetic force is generated from the tilt correcting coil in accordance with the direction and magnitude of the current flowing through the tilt correcting coil, and the angle of the electron beam scanning in accordance with the direction and magnitude of the magnetic force is carried to correct the tilt phenomena, thereby further enhancing the picture quality.

While the present invention has been particularly shown and described with reference to particular embodiment thereof, it will be understood by those skilled in the art that various changes in form and details may be effected therein without departing from the spirit and scope of the invention as defined by the appended claims. For example, the operation of the monitor is solely taken as the particular embodiment of the present invention, but the tilt correcting circuit according to the present invention may be employed in other general image processing systems.

What is claimed is:

1. A circuit for correcting tilt of a monitor comprising:

signal generating means for generating a first signal varying in accordance with an externally supplied control signal determined by user's selection and a constant second signal determined in accordance with an externally-supplied input signal; and means for adjusting a scanning angle of electron beam in accordance with direction and magnitude of current varying in accordance with a magnitude difference of said first signal and second signal, wherein said signal generating means comprises:

first control means including control signal amplifying means for amplifying said control signal amplifying means for amplify said control signal to provide an amplification signal, a first current signal output means for generating a first current signal varying in accordance with said amplification signal and externally-supplied input signal, and first current signal shaping means for smoothing said first current signal; and second control means including second current signal output means for generating a constant second current signal from said externally-supplied input signal, and second current signal shaping means for smoothing said second current signal to provide a second signal.

2. A circuit for correcting tilt of a monitor as claimed in claim 1, wherein said first control means further comprises control signal buffer means for buffering said amplification signal to provide a first buffer signal.

3. A circuit for correcting tilt of a monitor as claimed in claim 2, wherein said first control means further comprises:

a key matrix for providing a plurality of keys to be selected so as to output a key input signal; and a microprocessor for outputing the control signal Vin which is previously stored and corresponding to the key input signal when the key input signal is scanned.

4. A circuit for correcting tilt of a monitor as claimed in claim 2, wherein said first control means further comprises a variable resistor for varying output voltage, the varying output voltage being outputted by controlling said variable resistor, the varying output voltage being said control signal.

5. A circuit for correcting tilt of a monitor as claimed in claim 1, wherein said second control means further comprises input signal buffer means including distributing means for distributing said input signal to generate a distribution signal and buffer means for buffering said distribution signal to provide a second buffer signal.

6. A circuit for correcting tilt of a monitor as claimed in claim 1, wherein said adjusting means is comprised of a coil magnetized by said first signal and second signal to adjust said scanning angle of said electron beam.

7. A circuit for correcting tilt of a monitor as claimed in claim 1, wherein said control signal buffer means is comprised of a buffer for buffering said amplification signal of said control signal amplifying means to provide said first buffer signal.

8. A circuit for correcting tilt of a monitor as claimed in claim 7, wherein said first current signal output means comprises:

a first transistor for switching on or off in accordance with said first buffer signal, and for providing said first current signal;

a fourth resistor for controlling said first current of said first transistor;

a second transistor for switching on or off in accordance with said first buffer signal and second signal, and for controlling flow of the current through said adjusting means; and a fifth resistor for controlling the output current of said second transistor.

9. A circuit for correcting tilt of a monitor as claimed in claim 5, wherein said input signal buffer means comprises:

a sixth resistor and seven resistor connected in series to each other for distributing said externally-supplied input signal; and a buffer for buffering said distribution signal to provide said second buffer signal.

10. A circuit for correcting tilt of a monitor as claimed in claim 5, wherein said second current signal output means comprises:

a third transistor for switching in accordance with said second buffer signal, and for providing said second current signal;

an eighth resistor for controlling said second current signal of said third transistor;

a fourth transistor for switching in accordance with said second buffer signal and first signal, and for controlling flow of the current through said adjusting means; and a ninth resistor for controlling said output current of said fourth transistor.

11. A circuit for correcting tilt of a monitor comprising:

first control means including control signal amplifying means for amplifying a externally-supplied control signal determined in accordance with user's selection to produce an amplification signal, first current signal output means for switching in accordance with said amplification signal to generate a first current signal from an input signal, and first current signal shaping means for smoothing said first current signal to provide a first signal;

second control means including second current signal output means for generating a second current signal in accordance with said input signal, and second current signal shaping means for smoothing said second current signal to provide a second signal; and a tilt correcting coil for adjusting a scanning angle of electron beam in accordance with the direction and magnitude of the current varied in accordance with a magnitude difference between said first signal and second signal.

* * * * *